Figure 3:
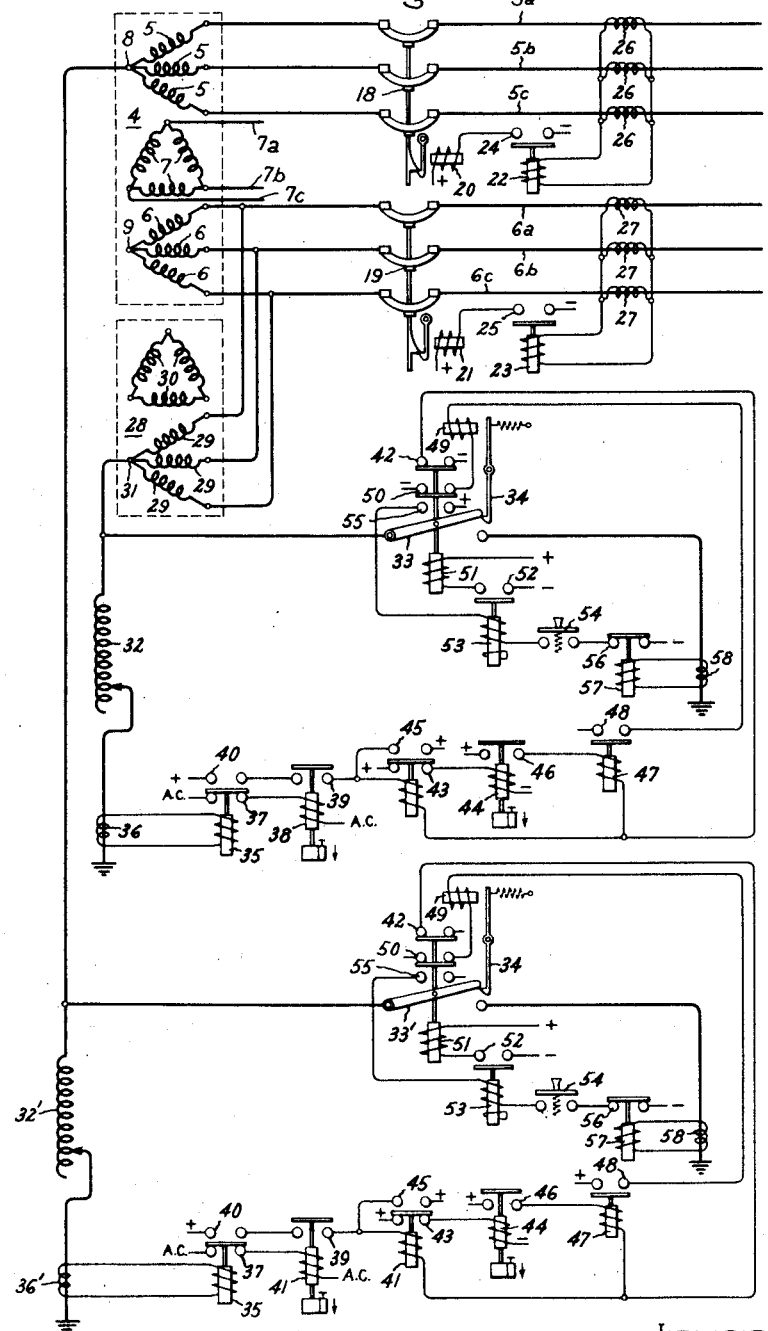

Sept. 15, 1942.     P. H. LIGHT     2,296,109
PROTECTION OF ALTERNATING CURRENT ELECTRIC POWER SYSTEMS
Filed Dec. 31, 1941     2 Sheets-Sheet 1
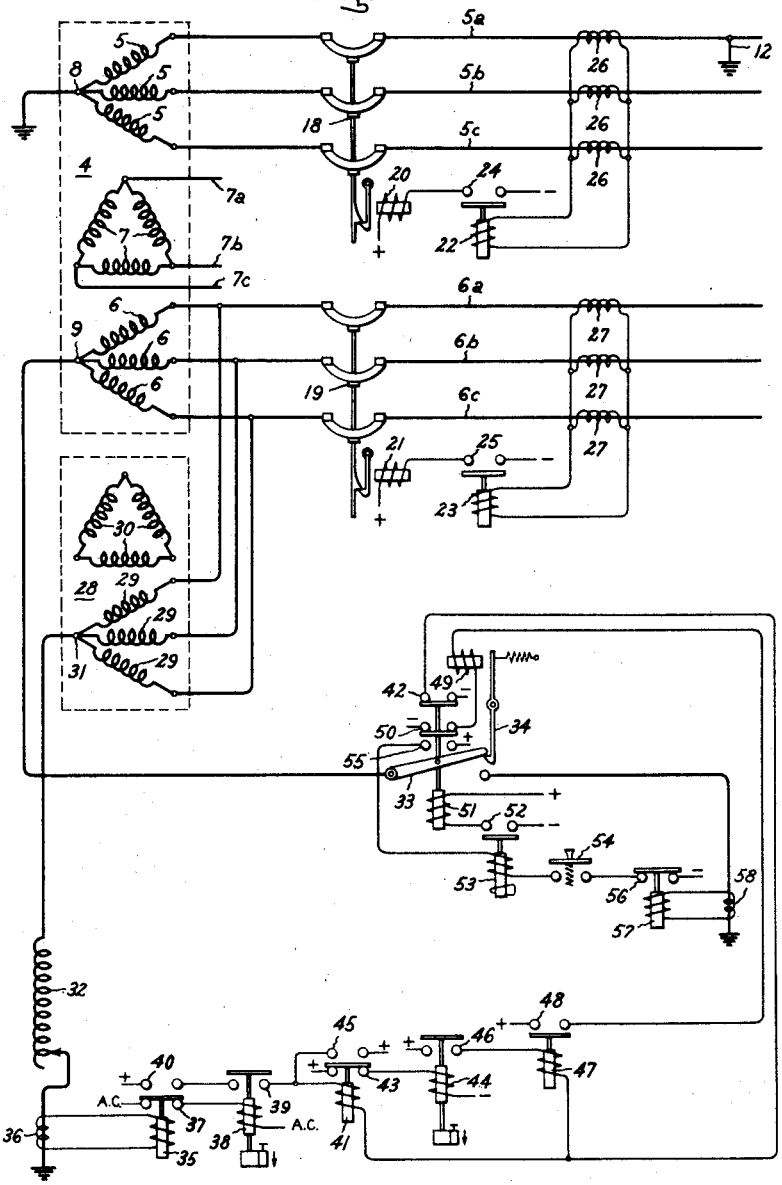
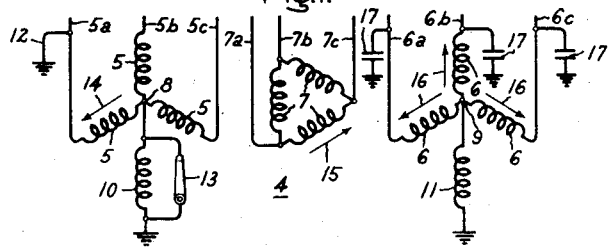
Inventor:
Philip H. Light,
by Harry E. Dunham
His Attorney.

UNITED STATES PATENT OFFICE 2,296,109

PROTECTION OF ALTERNATING-CURRENT ELECTRIC POWER SYSTEMS

Philip H. Light, Schenectady, N. Y., assignor to General Electric Company, a corporation of New York Application December 31, 1941, Serial No. 425,094

13 Claims. (Cl. 171—97)

My invention relates to improvements in the protection of alternating current electric power systems, and especially systems which include a polyphase multiwinding transformer or a bank of single phase multiwinding transformers having a low zero-phase sequence reactance relatively to the positive-phase sequence magnetizing reactance and at least two sets of star-connected windings to at least one set of which there is connected a circuit of the type wherein a fault to ground on a phase conductor of the circuit substantially increases the capacitance current to ground of the ungrounded phase conductors and wherein it is desired to ground the other set of windings either directly or through an impedance.

In power systems which operate without a neutral point grounded more or less directly, single conductor to ground faults of a transitory or arcing character may be suppressed by a ground fault neutralizing device, as disclosed in United States Letters Patent 1,537,371, without interruption of service. Since a large percentage of the faults on alternating current electric systems involve initially, at least, only a single conductor to ground, such neutralizing device materially improves the service continuity factor. The neutralizing device is usually connected between a neutral point of the system and ground and proportioned to have together with the transformer affording the neutral point, a zero-phase sequence inductance such as to provide on the occurrence of a ground on a phase conductor of the system a lagging current for effectively suppressing the capacitance current to ground of the ungrounded phase conductors. Usually the amount of the inductance furnished by the transformer in the neutralizer connection is a small proportion of the total inductance in this connection. In order to take care of faults which the ground fault neutralizer cannot suppress, a low impedance connection to ground may be established after the flow of lagging current in the neutralizer connection for a predetermined time without suppressing the ground fault, as disclosed in United States Letters Patent 1,378,557. This low impedance connection allows sufficient flow of fault current to insure the intended operation of ground fault responsive relays with which the system is usually provided to clear permanent ground faults. Of course, when this low impedance connection is established, there is a relatively heavy current flow in comparison with the lagging current flow. If the neutral point to which the ground fault neutralizer is connected is in a transformer comprising, for example, two sets of Y-connected windings and a set of delta-connected windings and the zero-phase sequence reactance of the transformer is low relatively to the positive-phase sequence magnetizing reactance or, in other words, if the current to ground in case of single conductor to ground faults is high relatively to the magnetizing current of the transformer, then the mutual coupling between the windings induces voltages in the windings of the other Y-connected set. If there is a ground fault neutralizer connected between the neutral point of this other set of Y-connected windings and ground, then since the resultant capacitance to ground of the phase conductors of the circuit connected to this other set of Y-connected windings and the ground fault neutralizer are in resonance, such relatively high voltages may be produced as to impair the system insulation. If the neutral point of the first set of Y-connected windings is normally operated with a low impedance ground connection, and the other set of Y-connected windings is normally operated with the ground fault neutralizer connection, then the same condition will prevail on the occurrence of a ground fault on the phase conductor of the circuit connected to the first set of Y-connected windings. This situation becomes especially critical when it is desired to change from a directly grounded system to a system using the ground fault neutralizer because any three-winding transformers already installed are likely to have been built without any consideration to the necessity for correctly proportioning the zero-phase sequence reactances. Likewise, the situation also requires careful study even in the installation of new apparatus if the transformer is built by someone other than the one who builds the ground fault neutralizer and who consequently is not in a position to select or determine the reactance characteristics of the transformer. The insulation breakdown possibilities mentioned may occur also in a polyphase core type transformer mounted in one tank and having two sets of Y-connected windings since in such a transformer, the core and tank may furnish such a low reluctance path for the zero-phase sequence flux that the transformer has relatively low impedance to the currents flowing to ground.

One object of my invention is to provide an improved arrangement for protecting a polyphase alternating current system so that ground fault neutralizers may safely be used in connection with transformers, such, for example, as those mentioned wherein the proportioning of the transformer reactances results in such mutual coupling as to endanger the system insulation on the occurrence of a ground fault on the system. This and other objects of my invention will appear in more detail hereinafter.

In accordance with my invention, I provide, for a polyphase alternating current system comprising a transformer having at least two sets of star-connected windings and a low zero-phase sequence reactance relatively to its positive-phase sequence magnetizing current and two polyphase circuits respectively connected to said sets of windings, a protective arrangement whereby the star point of one set may be normally connected substantially directly to ground or through a ground fault neutralizer and, in case of a ground fault on the circuit connected to this one set to establish an effective by-pass for the ground fault neutralizer, and whereby the circuit connected to the other set may be protected by a ground fault neutralizer and an effective by-pass therefor, without damage to the insulation of the parts of the system metallically connected to the transformer windings on the occurrence of a ground fault on either of said circuits. More specifically, in accordance with my invention, I provide for the circuit connected to the above-mentioned other set of windings a ground fault neutralizer connection which does not include the star point of this set and then, in case of ground faults of a non-transitory connection on the associated circuit, I by-pass this neutralizer connection either directly or by way of the star point of this set of windings, depending upon how the first-mentioned star point is grounded.

By the term "star-connected," I mean to include the connection commonly referred to as the zigzag connection. Also, wherever a multiplicity of polyphase windings is mentioned herein, it is to be understood that they may be star or zigzag or any combination of these two types of windings.

My invention will be better understood from the following description when considered in connection with the accompanying two sheets of drawings, and its scope will be pointed out in the appended claims.

In the accompanying two sheets of drawings, Fig. 1 is a schematic circuit diagram of a three-phase alternating current system embodying a Y-delta-Y-connected power transformer provided with ground fault neutralizers; Fig. 2 diagrammatically illustrates an embodiment of my invention; and Fig. 3 diagrammatically illustrates another embodiment of my invention.

Fig. 1 is a schematic diagram illustrating a three-phase alternating current electric power system comprising a multiwinding power transformer 4 having two sets of Y-connected windings 5 and 6 and a set of delta-connected windings 7. This transformer may be a polyphase transformer or a bank of single-phase transformers. To the windings 5 and 6 there are respectively connected by suitable means, not shown, the phase conductors 5a, 5b, 5c, and 6a, 6b, 6c of two three-phase circuits. To the windings 7 there may, also, be connected by suitable means, not shown, the phase conductors 7a, 7b, 7c of another three-phase circuit, but this is immaterial to my invention. The two sets of Y-connected windings 5 and 6 have neutral points 8 and 9 respectively, which are shown connected to ground through ground fault neutralizers 10 and 11 respectively. A ground fault of a non-transitory character is indicated at 12 on the phase conductor 5a, and it is assumed that the ground fault neutralizer 10 has been by-passed by the closing of a switch 13 a predetermined time after the occurrence of the fault which the ground fault neutralizer 10 has been unable to suppress.

With the closing of the switch 13, there will be a heavy flow of fault current to ground, as indicated by the arrow 14, in a circuit including the grounded winding 5, the conductor 5a, the fault 12 and return through the ground fault neutralizer by-pass switch 13. This current flow induces a voltage in the corresponding phase of the delta-connected windings 7. This voltage causes a current, indicated by the arrow 15, to circulate in each of the windings 7. This circulating current in turn induces in the windings 6 inphase voltages which cause inphase currents, indicated by the arrows 16, to flow in these windings. These inphase currents 16 flow in parallel circuits including the respective phase conductors 6a, 6b, 6c, their capacitances 17 to ground and return through the ground fault neutralizer 11. Since in these parallel paths the capacitances 17 and the reactance of the neutralizer 11 are such that each path is a series resonant circuit, it is obvious that such heavy voltages may occur across the neutralizer 11 as to endanger not only the neutralizer but, also, any part of the system metallically connected to the windings 6 because of the rise in potential of the neutral point 9. Of course, as far as the insulation danger above-outlined is concerned, it is, in general, immaterial whether the ground fault occurs on a phase conductor associated with the circuit connected to the windings 5 or a phase conductor of the circuit connected to the windings 6. From the foregoing, it will, also, be obvious that if the windings 5, for example, were normally operated with the neutral point 8 substantially directly connected to ground, as is the case with the switch 13 closed, and the neutral point 9 with the ground fault neutralizer 11, then the same overstressing of the insulation of the parts metallically connected to the windings 6 can occur in case of a ground fault on the circuit connected to the windings 5.

From the foregoing, it will also be observed that upon the occurrence of a ground fault on one phase conductor of a circuit connected to a set of Y-connected windings there exists, with the neutral of these windings connected substantially directly to ground, a relatively low reactance path for ground fault current flow and a path for each of the resulting mutually induced currents in each of the other two sets of windings. The relative reactances of these paths will determine the magnitude of the voltage stresses and the consequent insulation danger. Thus, if the reactance of the delta-connected windings 7 were zero or so small that only a current, small in comparison to the rating of the neutralizer 11, could flow in this neutralizer, there would be no overstressing of the insulation. As the reactance of the windings 7 increases, the mutual effects become greater, and something must be done to avoid overstressing the insulation. In general, if the zero-phase sequence reactance of a multiwinding transformer comprising at least two sets of star-connected windings is low relatively to its positive-phase sequence magnetizing reactance, then there is danger of overstressing the insulation on the occurrence of a ground fault on a phase conductor of the circuit connected to one set of star-connected windings when the star point of this set is connected substantially directly to ground and a ground fault neutralizer is connected in the star point of the other set of star-connected windings. Stated in another way, if the transformer construction is such that on the occurrence of a ground fault on the circuit connected to one set of star-connected windings, there may flow when the star point of this set is connected directly to ground a large fault current relatively to the transformer magnetizing current, then there is danger of overstressing the insulation if the neutral point of the other star-connected set is connected to ground through a ground fault neutralizer.

In some cases, this overstressing of the insulation may occur in a transformer having only two sets of windings, each star-connected. Thus, for example, in a Y-Y-connected polyphase core type transformer mounted in one tank, the core and tank may furnish a low reluctance path for the flux due to the flow of ground fault current in the case of a ground fault on a phase conductor of the circuit connected to one set of windings. Under such conditions, the transformer reactance may be low enough for the mutually induced currents in the other set of windings to assume dangerous values if a ground fault neutralizer is connected in the neutral point of this other set of Y-connected windings.

Referring now to the embodiment of my invention diagrammatically illustrated in Fig. 2, I have shown, as in Fig. 1, part of a three-phase alternating current electric power system comprising a multiwinding power transformer 4 having two Y-connected sets of windings 5 and 6. To these are connected through suitable circuit interrupting means 18 and 19, circuits having phase conductors 5a, 5b, 5c and 6a, 6b, 6c. The transformer 4 also includes the delta-connected set of windings 7 to which there may be connected a circuit comprising phase conductors 7a, 7b, 7c by suitable means, not shown. The fact that, in the schematic showing of the transformer 4 in Fig. 2, the windings 5 and 6 are not drawn 120° apart and parallel to the winding 7 in no way changes the insulation overstressing problem discussed in connection with Fig. 1. The circuit interrupters 18 and 19 are illustrated as latched closed circuit breakers respectively having trip coils 20 and 21. For effecting the opening of the circuit breakers 18 and 19 in response to ground faults on the circuits which they control, it is usual to provide ground fault responsive relaying means, herein illustrated simply as overcurrent relays 22 and 23 having normally open contacts 24 and 25 respectively in the circuits of the trip coils 20 and 21 respectively. For response to the flow of ground fault current, the relays 22 and 23 may be connected in circuit with the parallel-connected current transformers 26 and 27 connected in series relation with the phase conductors 5a, 5b, 5c and 6a, 6b, 6c respectively.

In the embodiment of my invention shown in Fig. 2, the neutral point 8 of one set of Y-connected windings 5 is normally connected directly to ground, as shown. In connection with the portion of the system metallically connected to the windings 6, however, it is desired to suppress transitory ground faults by a ground fault neutralizer which, if connected in the normally grounded neutral point 9, would lead to the overstressing of insulation, as pointed out in connection with Fig. 1. In order to avoid this, I provide, in accordance with my invention, a second star point for the circuit 6a, 6b, 6c by suitable means, such as a grounding transformer 28 having a set of star-connected windings 29 and a set of polygonally connected windings 30. Where this second star point is established on the circuit 6a, 6b, 6c is, in general, immaterial and it will be apparent to those skilled in the art that other grounding transformer means such as a zig-zag transformer may be used to provide this second star point. Further in accordance with my invention, I establish through the star point 31 of the windings 29 a neutralizer connection to ground having a zero-phase sequence inductance proportioned to provide on the occurrence of a ground on one of the phase conductors 6a, 6b, 6c a lagging current for effectively suppressing the capacitance current to ground at the grounded point. As shown, this connection includes the zero-phase sequence reactance of the transformer 28 and the reactance of the ground fault neutralizer 32 which may be adjustable for tuning in dependence on the amount of the system in service and in metallic connection with the windings 6.

This ground fault neutralizer connection will take care of transitory ground faults on the circuits 6a, 6b, 6c. But in order that the system ground fault relaying means may take care of non-transitory ground faults on this circuit, I arrange to establish a low impedance path to ground from the neutral point 9 in response to a predetermined current flow for a predetermined time in the neutralizer connection through the neutral point 31. For this purpose, the neutral point 9 may be arranged to be connected substantially directly to ground by the closing of suitable switching means, herein illustrated as a normally latched open but biased to close switch 33. The tripping of the latch 34 of this switch is effected by a suitable time delay relay sequence which is initiated by the operation of a relay 35. This relay is operative in dependence on the current flowing in the neutralizer 32 and may be connected to be energized from a current transformer 36 in series therewith, as shown. The normally closed contacts 37 of the relay 35 maintain the energizing circuit of a time delay dropout relay 38, which may be of the induction disk alternating current energized type, examples of which are well known to the art.

When the relay 38 closes its contacts 39 while the relay 35 is energized with its contacts 40 closed, the circuit of an auxiliary relay 41 is completed through b auxiliary switch contacts 42 on the grounding switch 33. This auxiliary relay 41 through its normally closed contacts 43 controls the circuit of a second time delay relay 44 and, when energized, also completes its own circuit through its normally open contacts 45. When the second time delay relay 44 drops out, the closing of its normally open contacts 46 completes the circuit of a tripping relay 47. This relay picks up to close its normally open contacts 48 and thereby to complete the circuit of the grounding switch trip coil 49 through the b auxiliary switch contacts 50 on the grounding switch. The energization of the trip coil 49 actuates the latch 34 to effect the closing of the grounding switch 33.

If there is only one neutral point on the circuit metallically connected to the circuit 6a, 6b, 6c, the relays 44 and 47 may be omitted and the relay 41 arranged to do the tripping. But if there are two or more such neutral points to be grounded, then any differences in timing of the relays 38 at different locations, which resulted in the closing of one grounding switch before the closing of the others, could prevent the closing of the others if only one time delay relay 38 were used since the relays 35 would drop out with the closing of a grounding switch thus reenergizing the relays 38. The second timing relay 44 prevents this since no grounding switch can be closed until after its associated time delay relay 38 has properly functioned.

For restoring the grounding switch 33 to its open position, it may be provided with suitable opening means, indicated as a winding 51 whose circuit is controlled by the contacts 52 of a relay 53. As illustrated, this relay is of the so-called hesitating control type which, when once energized to close its contacts, drops out with a time delay sufficient to insure the completion of the opening action of the grounding switch. The circuit of the closing control relay 53 includes a control switch 54 which may be manually operated the a auxiliary switch contacts 55 on the grounding switch 33 and the normally closed contacts 56 of a closing prevention relay 57. This relay 57 is arranged to be energized in dependence on the current flowing in the ground connection through the grounding switch 33 so that this switch may not be opened while it is carrying current. The relay 57 may be connected to be energized from a current transformer 58 in series relation with the ground connection through the grounding switch 33, as shown.

Assuming a ground as at 12 on the phase conductor 5a of the circuit 5a, 5b, 5c as in the description of Fig. 1, then with the arrangement shown in Fig. 2, inphase voltages are induced in the windings 6, just as described in connection with Fig. 1. But no inphase currents can flow in the windings 6 in consequence of these voltages since there is no circuit for such currents as long as the neutral point 9 is isolated from ground. Some increase in potential of the neutral point 9 relatively to ground may occur since the zero-phase sequence reactance of the delta-connected windings 7 is increased in comparison with the arrangement shown in Fig. 1. However, this increase in potential is relatively small in comparison with the increase possible if the neutral point 9 were connected to ground through a ground fault neutralizer, as in Fig. 1. The increase in reactance of the delta-connected windings 7 in consequence of no path for the flow of inphase currents in the windings 6 tends to reduce the ground fault current in the fault 12, but no enough to prevent the desired relaying operation on the circuit 5a, 5b, 5c.

A ground fault on a phase conductor of the circuit 6a, 6b, 6c, if of a transitory character, will be suppressed by the action of the ground fault neutralizer 32. If the ground fault is of a non-transitory character, then after a predetermined time the relaying sequence of the relays 35, 38, 41, 44 and 47 will effect the closing of the grounding switch 33 whereby to connect the neutral point 9 substantially directly to ground so that the ground fault relaying of the circuit 6a, 6b, 6c can function. The occurrence of a ground on a phase conductor of the circuit 6a, 6b, 6c does not materially alter the potential of the neutral point 8 since this is connected substantially directly to ground.

In the embodiment of my invention shown in Fig. 3, instead of directly grounding the neutral point 8 of the transformer 4, as in Fig. 2, this neutral point is connected to ground through a ground fault neutralizer 32' which is arranged to be by-passed by a grounding switch 33'. The control of this grounding switch is the same as that of the grounding switch 33 of Fig. 1 except that the relay 35 is connected to suitable means, such as a current transformer 36' in series relation with the ground fault neutralizer 32' so as to respond in dependence on the current flowing therein.

As in the embodiment of my invention illustrated in Fig. 2, the connection to ground on the neutral point 31 of the grounding transformer 28 includes the ground fault neutralizer 32. However, instead of by-passing this neutralizer through a grounding switch between the neutral point 9 and ground, as in Fig. 2, the grounding switch 33 is arranged to establish a low impedance path to ground directly from the neutral point 31. The control of the grounding switch 33 in this case is just the same as in the arrangement shown in Fig. 2.

With the arrangement shown in Fig. 3, it will be obvious that if a non-transitory ground fault occurs on a phase conductor of the circuit 5a, 5b, 5c, the grounding switch 33' will be closed after a predetermined time. However, as pointed out in connection with the embodiment of my invention shown in Fig. 2, the inphase voltages in the power transformer windings 6 cannot produce any flow of zero-phase sequence current in the parts metallically connected to these windings, and accordingly, no serious rise in potential relatively to ground can occur to effect the insulation of the transformers 4 and 28 or any part of the system metallically connected to the windings 6. In case of a ground on a phase conductor of the circuit 6a, 6b, 6c of a transitory character, the ground fault neutralizer 32 will function to suppress the capacitance current to ground at the grounded point. If the ground is of a non-transitory character, then after a predetermined time the grounding switch 33 will by-pass the neutralizer 32 so that the ground fault relaying of the portion of the system connected to the phase conductors 6a, 6b, 6c can function to disconnect the faulty portion of the system.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In a polyphase alternating current system of the type wherein a fault to ground on one phase conductor of at least one of the circuits of the system substantially increases the capacitance current to ground of the ungrounded conductors of one circuit, a multiwinding transformer having a low zero-phase sequence reactance relatively to its positive phase sequence magnetizing reactance and at least two sets of star-connected windings, the star point of one of said sets of windings being isolated from ground, two polyphase circuits respectively connected to said sets of star-connected windings, a zero-phase sequence inductance connection to ground for the particular circuit connected to the star point of the other set of star-connected windings proportioned to provide on the occurrence of a ground on a phase conductor of said particular circuit a lagging current for effectively suppressing the capacitance current to ground at the grounded point, means for establishing a low impedance connection to ground for said particular circuit including means operative in dependence on the current flowing in said inductance connection a predetermined time after the occurrence on a phase conductor of said particular circuit of a ground fault which is not suppressed by the lagging current flowing in said inductance connection, and inductive means for establishing a second star point on the circuit connected to the set of windings having the isolated star point and a neutralizer connection to ground through said second star point having a zero-phase sequence inductance proportioned to provide on the occurrence of a ground on a phase conductor of said particular circuit a lagging current for effectively suppressing the capacitance current to ground at the grounded point.

2. In a polyphase alternating current system of the type wherein a fault to ground on one phase conductor of at least one of the circuits of the system substantially increases the capacitance current to ground of the ungrounded conductors of one circuit, a multiwinding transformer having a low zero-phase sequence reactance relatively to its positive phase sequence magnetizing reactance and at least two sets of star-connected windings, the star point of one of said sets of windings being normally isolated from ground, means for connecting the star point of the other set of star-connected windings substantially directly to ground, two polyphase circuits respectively connected to said sets of star-connected windings, inductive means for establishing a second star point on the particular circuit connected to the set of windings having the normally isolated star point and a neutralizer connection to ground through said second star point having a zero-phase sequence inductance proportioned to provide on the occurrence of a ground on a phase conductor of said particular circuit a lagging current for effectively suppressing the capacitance current to ground at the grounded point.

3. In a polyphase alternating current system of the type wherein a fault to ground on one phase conductor of at least one of the circuits of the system substantially increases the capacitance current to ground of the ungrounded conductors of one circuit, a multiwinding transformer having a low zero-phase sequence reactance relatively to its positive phase sequence magnetizing reactance and at least two sets of star-connected windings, the star point of one of said sets of windings being isolated from ground, a low impedance connection to ground from the star point of the other set of star-connected windings, two polyphase circuits respectively connected to said sets of star-connected windings, inductive means for establishing a second star point on the particular circuit connected to the set of windings having the normally isolated star point, a neutralizer connection to ground through said second star point having a zero-phase sequence inductance proportioned to provide on the occurrence of a ground on a phase conductor of said particular circuit a lagging current for effectively suppressing the capacitance current to ground at the grounded point, and means for establishing a low impedance connection to ground from said normally isolated star point including means operative in dependence on the current flowing in said neutralizer connection a predetermined time after the occurrence on a phase conductor of said particular circuit of a ground fault which is not suppressed by the lagging current flowing in said neutralizer connection.

4. In a three-phase alternating current system of the type wherein a fault to ground on one phase conductor of at least one of the circuits of the system substantially increases the capacitance current to ground of the ungrounded conductors of one circuit, a power transformer having at least two sets of Y-connected windings and a set of delta-connected windings, the neutral point of one of said sets of Y-connected windings being normally isolated from ground, means for connecting the neutral point of the other set of Y-connected windings substantially directly to ground, two three-phase circuits respectively connected to said sets of Y-connected windings, three-phase inductive means for establishing a second neutral point on the particular circuit connected to the set of windings having the normally isolated neutral point, and a neutralizer connection to ground through said second neutral point having a zero-phase sequence inductance proportioned to provide on the occurrence of a ground on a phase conductor of said particular circuit a lagging current for effectively suppressing the capacitance current to ground at the grounded point.

5. In a polyphase alternating current system of the type wherein a fault to ground on one phase conductor of at least one of the circuits of the system substantially increases the capacitance current to ground of the ungrounded conductors of one circuit, a multiwinding transformer having a low zero-phase sequence reactance relatively to its positive phase sequence magnetizing reactance and at least two sets of star-connected windings, the star point of one of said sets of windings being normally isolated from ground, means for connecting the star point of the other set of star-connected windings substantially directly to ground, two polyphase circuits respectively connected to said sets of star-connected windings, a zero-phase sequence inductance connection to ground for the particular circuit connected to the star-connected windings having the normally isolated star point proportioned to provide on the occurrence of a ground on a phase conductor of said particular circuit a lagging current for effectively suppressing the capacitance current to ground at the grounded point, and means for establishing a low impedance connection to ground for said particular circuit including means operative in dependence on the current flowing in said inductance connection a predetermined time after the occurrence on a phase conductor of said particular circuit of a ground fault which is not suppressed by the lagging current flowing in said inductance connection.

6. In a three-phase alternating current system of the type wherein a fault to ground on one phase conductor of at least one of the circuits of the system substantially increases the capacitance current to ground of the ungrounded phase conductors of the one circuit, a power transformer having a low zero-phase sequence reactance relatively to its positive-phase sequence magnetizing reactance and at least two sets of Y-connected windings, the neutral point of one of said sets of Y-connected windings being normally isolated from ground, means for connecting the neutral point of the other set of Y-connected windings substantially directly to ground, two three-phase circuits respectively connected to said sets of Y-connected windings, a zero-phase sequence inductance connection to ground for the particular circuit connected to the Y-connected windings having the normally isolated neutral point proportioned to provide on the occurrence of a ground on a phase conductor of said particular circuit a lagging current for effectively suppressing the capacitance current to ground at the grounded point, and means for establishing a low impedance connection to ground for said particular circuit including means operative in dependence on the current flowing in said inductance connection a predetermined time after the occurrence on a phase conductor of said particular circuit of a ground fault which is not suppressed by the lagging current flowing in said inductance connection.

7. In a polyphase alternating current system of the type wherein a fault to ground on one phase conductor of at least one of the circuits of the system substantially increases the capacitance current to ground of the ungrounded conductors of one circuit, a multiwinding transformer having at least two sets of star-connected windings and a set of polygonally-connected windings, the star point of one of said sets of windings being normally isolated from ground, means for connecting the star point of the other set of star-connected windings substantially directly to ground, two polyphase circuits respectively connected to said sets of star-connected windings, a zero-phase sequence inductance connection to ground for the particular circuit connected to the star-connected windings having the normally isolated star point proportioned to provide on the occurrence of a ground on a phase conductor of said particular circuit a lagging current for effectively suppressing the capacitance current to ground at the grounded point, and means for establishing a low impedance connection to ground for said particular circuit including means operative in dependence on the current flowing in said inductance connection a predetermined time after the occurrence on a phase conductor of said particular circuit of a ground fault which is not suppressed by the lagging current flowing in said inductance connection.

8. In a three-phase alternating current system of the type wherein a fault to ground on one phase conductor of at least one of the circuits of the system substantially increases the capacitance current to ground of the ungrounded phase conductors of the one circuit, a power transformer having two sets of Y-connected windings and one set of delta-connected windings, the neutral point of one of said sets of Y-connected windings being normally isolated from ground, means for connecting the neutral point of the other set of Y-connected windings substantially directly to ground, two three-phase circuits respectively connected to said sets of Y-connected windings, a zero-phase sequence inductance connection to ground for the particular circuit connected to the Y-connected windings having the normally isolated neutral point proportioned to provide on the occurrence of a ground on a phase conductor of said particular circuit a lagging current for effectively suppressing the capacitance current to ground at the grounded point, and means for establishing a low impedance connection to ground for said particular circuit including means operative in dependence on the current flowing in said inductance connection a predetermined time after the occurrence on a phase conductor of said particular circuit of a ground fault which is not suppressed by the lagging current flowing in said inductance connection.

9. In a polyphase alternating current system of the type wherein a fault to ground on one phase conductor of at least one of the circuits of the system substantially increases the capacitance current to ground of the ungrounded phase conductors of the one circuit, a multiwinding power transformer having a low zero-phase sequence reactance relatively to its positive-phase sequence magnetizing reactance and at least two sets of star-connected windings, the star point of one of said sets being normally isolated from ground and the star point of the other set of star-connected windings having a low impedance connection to ground, two polyphase circuits respectively connected to said sets of star-connected windings, inductive means for establishing a second star point on the particular circuit connected to the star-connected windings having the normally ungrounded star point, a neutralizer connection to ground through said second star point having a zero-phase sequence inductance proportioned to provide on the occurrence of a ground on a phase conductor of said particular circuit a lagging circuit for effectively suppressing the capacitance current to ground at the grounded point, and means for establishing a low impedance connection to ground from said normally ungrounded star point including means operative in dependence on the current flowing in said neutralizer connection a predetermined time after the occurrence on a phase conductor of said particular circuit of a ground fault which is not suppressed by the lagging current flowing in said neutralizer connection.

10. In a three-phase alternating current system of the type wherein a fault to ground on one phase conductor of at least one of the circuits of the system substantially increases the capacitance current to ground on the ungrounded phase conductors of the one circuit, a power transformer having two sets of Y-connected windings and one set of delta-connected windings, a neutral point of one of said sets of Y-connected windings being normally isolated from ground and the neutral point of the other set of Y-connected windings having a low impedance connection to ground, two three-phase circuits respectively connected to said sets of Y-connected windings, inductive means for establishing a second neutral point on the particular circuit connected to the Y-connected windings having the normally ungrounded neutral point, a neutralizer connection to ground through said second neutral point having a zero-phase sequence inductance proportioned to provide on the occurrence of a ground on a phase conductor of said particular circuit a lagging current for effectively suppressing the capacitance current to ground at the grounded point, switching means for establishing a low impedance connection to ground from said normally ungrounded neutral point, and means operative in dependence on the current flowing in said neutralizer connection a predetermined time after the occurrence on a phase conductor of said particular circuit of a ground fault which is not suppressed by the lagging current flowing in said neutralizer connection for effecting the closure of said switching means.

11. In a polyphase alternating current system of the type wherein a fault to ground on one phase conductor of at least one of the circuits of the system substantially increases the capacitance current to ground of the ungrounded phase conductors of the one circuit, a multiwinding power transformer having a low zero-phase sequence reactance relatively to its positive phase sequence magnetizing reactance and at least two sets of star-connected windings, a neutralizer connection to ground through the neutral point of one of said sets of star-connected windings having a zero-phase sequence inductance proportioned to provide on the occurrence of a ground on a phase conductor of the circuit connected to said one set of star-connected windings a lagging current for effectively suppressing the capacitance current to ground at the grounded point, means for establishing a low impedance connection to ground from the neutral point of said one set of star-connected windings including means operative in dependence on the current flowing in the star connection through said star point a predetermined time after the occurrence on a phase conductor of said circuit of a ground fault which is not suppressed by the lagging current flowing in said neutralizer connection, inductive means for establishing a second star point on the circuit connected to the other set of star-connected windings, a neutralizer connection to ground through said second star point having a zero-phase sequence inductance proportioned to provide on the occurrence of a ground on a phase conductor of the circuit connected to said other set of star-connected windings a lagging current for effectively suppressing the capacitance current to ground at the grounded point, means for establishing a low impedance connection to ground through said second neutral point including means operative in dependence on the current flowing in said neutralizer connection through said second neutral point a predetermined time after the occurrence on a phase conductor of said circuit of a ground which is not suppressed by the lagging current flowing in the neutralizer connection through said second star point.

12. In a three-phase alternating current system of the type wherein a fault to ground on one phase conductor of a circuit of the system substantially increases the capacitance current to ground of the ungrounded conductors of the circuit, a power transformer having two sets of Y-connected windings and one set of delta-connected windings, a neutralizer connection to ground through the neutral point of one of said sets of Y-connected windings having a zero-phase sequence inductance proportioned to provide on the occurrence of a ground on a phase conductor of the circuit connected to said one set of Y-connected windings a lagging current for effectively suppressing the capacitance current to ground at the grounded point, means for establishing a low impedance connection to ground from the neutral point of said one set of Y-connected windings including means operative in dependence on the current flowing in the neutralizer connection through said neutral point a predetermined time after the occurrence on a phase conductor of said circuit of a ground fault which is not suppressed by the lagging current flowing in said neutralizer connection, inductive means for establishing a second neutral point on the circuit connected to the other set of Y-connected windings, a neutralizer connection to ground through said second neutral point having a zero-phase sequence inductance proportioned to provide on the occurrence of a ground on a phase conductor of the circuit connected to said other set of Y-connected windings a lagging current for effectively suppressing the capacitance current to ground at the grounded point, means for establishing a low impedance connection to ground through said second neutral point including means operative in dependence on the current flowing in said neutralizer connection through said second neutral point a predetermined time after the occurrence on a phase conductor of said circuit of a ground which is not suppressed by the lagging current flowing in the neutralizer connection through said second neutral point.

13. In combination, a polyphase circuit, two star-connected windings connected to said circuit, an impedance connection between the star point of one of said windings and ground, and means dependent upon the current through said impedance for establishing a low impedance circuit between ground and the other star point.

PHILIP H. LIGHT.